United States Patent [19]

Boutevin

[11] Patent Number: 4,992,104
[45] Date of Patent: Feb. 12, 1991

[54] METHOD FOR PREPARING MORTARS AND CONCRETES USING POLYFLUORINATED SURFACE-ACTIVE COMPOUNDS AS WATER-REDUCING PLASTICIZERS

[75] Inventor: Bernard Boutevin, Montpellier, France

[73] Assignee: Societe Atochem, Puteaux, France

[21] Appl. No.: 174,861

[22] Filed: Mar. 29, 1988

[30] Foreign Application Priority Data

Apr. 2, 1987 [FR] France ................. 87 04621

[51] Int. Cl.$^5$ ............... C04B 24/26; C04B 24/24
[52] U.S. Cl. .............................. 106/724; 106/823; 106/725; 106/727; 106/728
[58] Field of Search ............ 106/90, 314; 524/5

[56] References Cited

U.S. PATENT DOCUMENTS

| | | | |
|---|---|---|---|
| 2,727,923 | 12/1955 | Husted | 260/527.6 |
| 4,293,440 | 10/1981 | Elphingstone et al. | 252/317 |
| 4,328,145 | 5/1982 | Bobrowski et al. | 106/89 |
| 4,362,762 | 12/1982 | Linquist et al. | 106/111 |

FOREIGN PATENT DOCUMENTS

| | | | |
|---|---|---|---|
| 2088699 | 12/1971 | France. | |
| 2575457 | 12/1984 | France. | |
| 0222640 | 1/1983 | Japan | 106/314 |

OTHER PUBLICATIONS

Chemical Abstracts, vol. 101, No. 22, 12.26/84, Columbus, OH, US, No. 197088t.
French Search Report for Priority Document FR 8704621.

Primary Examiner—William R. Dixon, Jr.
Assistant Examiner—Melissa Bonner
Attorney, Agent, or Firm—Morgan & Finnegan

[57] ABSTRACT

The invention relates to the preparation of mortars and concretes in the presence of a water-reducing plasticizer. The plasticizer used is a surface-active compound containing at least one perfluoro group and at least one ionic or nonionic hydrophilic group. It is possible for these groups to be linked directly or via one or more divalent chain links.

6 Claims, No Drawings

METHOD FOR PREPARING MORTARS AND CONCRETES USING POLYFLUORINATED SURFACE-ACTIVE COMPOUNDS AS WATER-REDUCING PLASTICIZERS

FIELD OF THE INVENTION

The present invention relates to construction materials and, more particularly, to mortars and concretes intended for construction of buildings or for public works.

BACKGROUND OF THE INVENTION

It is known that the quantity of water used in the preparation of mortar or concrete is always greater than that theoretically necessary to obtain proper hydration of the cement. However, excess water is necessary so that the fresh mortar or concrete is workable, that is, sufficiently capable of being worked and easy to shutter. At the same time, this excess water is disadvantageous because it leads to a decrease in mechanical strength characteristics, reduced homogeneity, bleeding, segregation and a certain delay in setting.

To reduce the quantity of water without harming the workability of mortars and concretes, it is known to incorporate therein wetting agents, generally known as "water-reducing plasticizers". Among the products used for this purpose are lignosulphonates, alkali metal salts of sulphonated styrenoindenic hydrocarbons, polyethoxylated alkylphenols, melamine/formaldehyde, naphthalensulphonic acid/formaldehyde or melamine/phenol/formaldehyde polycondensates, various water-soluble homopolymers or copolymers, and organosiloxanes. Applicant has discovered an agent which overcomes the disadvantages mentioned above.

SUMMARY OF THE INVENTION

It has now been found that polyfluorinated surface active agents are excellent water-reducing plasticizers, even when they are used in very low quantities. It has also been found that, in quantities which are still relatively small, some of them have an additional marked air-entraining effect permitting the production of mortars and concretes which are light in weight.

DETAILED DESCRIPTION OF THE INVENTION

The polyfluorinated surfactants to be used in the invention may vary widely in nature (monomolecular or macromolecular) provided that they contain at least one perfluoro group and at least one ionic or nonionic hydrophilic group, it being possible for these groups to be linked directly or via one or more divalent chain links.

The perfluoro group(s) (denoted hereafter by $R_F$) are preferably linear or branched perfluoroalkyl radicals containing from 2 to 20 carbon atoms and advantageously from 4 to 14 carbon atoms.

An ionic hydrophilic group may be anionic (for example, COOH or $SO_3H$), cationic (for example, quaternary ammonium) or amphoteric (for example, betaine or sulphobetaine) in nature. As examples of nonionic hydrophilic groups, polyacrylamide groups and polyoxyalkylene groups may be more particularly mentioned.

When the perfluoro and hydrophilic groups are not linked directly, the connecting chain link(s) may be of very diverse nature. The simplest type of chain link consists of an alkylene bridge, especially polymethylene and above all ethylene or propylene. The linking of this alkylene bridge with the perfluoro and hydrophilic groups may take place directly or via a functional group (for example ether, thioether, ester, sulphonamide or carboxamide). A functional group of this kind may also be present between two or more alkylene chain links. The latter may optionally carry substituents such as hydroxyl groups or halogen atoms (particularly chlorine) as, for example, in the chain links $-CCl_2-$ or $-CHCl-CH_2-CCl_2-$.

As examples of polyfluorinated surface-active agents according to the invention, there may be particularly mentioned, without any limitations being implied:

(A) Polyfluorocarboxylic or -sulphonic acids of formulae:

$$R_F-(CH_2)_m-COOH \quad (I)$$

$$R_F-(CH_2)_m-SO_3H \quad (II)$$

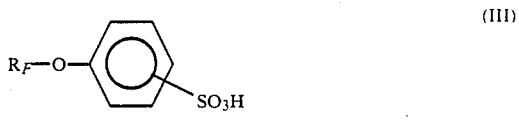

(III)

in which m is an integer ranging from 0 to 12, preferably equal to 0 or 2, and salts of such acids.

(B) Compounds containing a quaternary ammonium group. of formulae:

(IV)

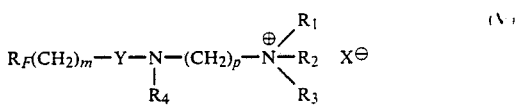

(V)

in which m is as defined above, n is an integer ranging from 1 to 12, preferably equal to 2, p is an integer ranging from 1 to 10, preferably equal to 3, the symbols $R_1$, $R_2$ and $R_3$, which are identical or different, each denote a hydrogen atom or alkyl, cycloalkyl, alkenyl, cycloalkenyl, hydroxyalkyl or aryl radical, it being possible for two of these symbols to be linked together, or $R_1$, $R_2$ and $R_3$ form, together with the nitrogen atom, the residue of a pyridinic tertiary amine, Y denotes a CO or $SO_2$ group, $R_4$ denotes a hydrogen atom or an alkyl radical, and $X^\ominus$ denotes an anion (for example halide, sulphate, alkylsulphate, arylsulphonate, and the like).

For a more detailed description of these compounds reference may be made to the following patents whose contents are hereby incorporated by reference: French Pat. Nos. 1,588,482; 2,044,070; 2,084,888; and 2,153,489; as well as U.S. Pat. Nos. 2,727,923; 3,257,407; and 3,535,389.

(C) Betaines and sulphobetaines of formula:

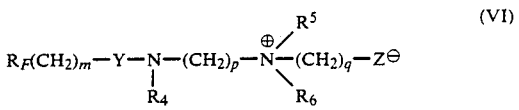

(VI)

in which the symbols m, p, $R_4$ and Y have the same meanings as above, q is an integer capable of ranging from 1 to 20, preferably equal to 1 or 2, $R_5$ and $R_6$, which are identical or different, denote alkyl (preferably methyl) radicals, and $Z^\ominus$ denotes a $SO_3^\ominus$ or $COO^\ominus$ group.

These compounds are described in French Pat. Nos. 2,084,888; 2,088,699; 2,088,941; 2,127,287; 2,128,028; and 2,390,426; as well as European Pat. No. 17,568, whose contents are hereby incorporated by reference:

(D) Amine oxides of formula:

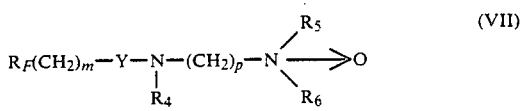
(VII)

in which the various symbols have the same meanings as above. These oxides are described in French Pat. Nos. 2,035,589; and 2,477,144, hereby incorporated by reference.

(E) Random copolymers obtained by radical polymerization of acrylamide and a polyfluorinated acrylate of formula:

$$R_F(CH_2)_n\text{—}OCOC(R_7)\text{=}CH_2 \qquad (VIII)$$

where n is as defined above and $R_7$ denotes a hydrogen atom or a methyl radical. The molar ratio acrylamide/acrylate is preferably between 10 and 200.

(F) Random cotelomers obtained by redox telomerization of acrylamide and a polyfluorinated acrylate of formula (VIII) above, with carbon tetrachloride. The molar ratio acrylamide/acrylate is preferably between 10 and 500.

(G) Block telomers described in European Pat. Nos. 19,584; 188,952; and 189,698, hereby incorporated by reference, and more particularly, those derived from acrylamide, corresponding to the following formulae:

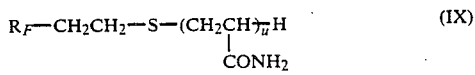
(IX)

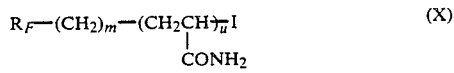
(X)

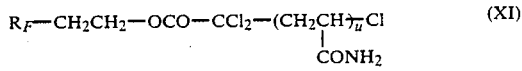
(XI)

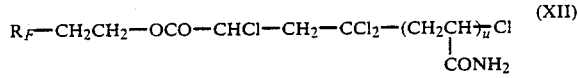
(XII)

in which m is defined above and u is an integer ranging from 5 to 1000, preferably between 10 and 700.

The polyfluorinated surfactants of this invention provide a very marked water-reducing plasticizing effect and consequently can be used in very small quantities. The latter are generally between 0.005 and 2% and, preferably, between 0.01 and 0.5%, relative to the weight of water.

Among the above mentioned compounds, the block telomers of formula (IX) and (X) have been found particularly advantageous. They are very efficient even in extremely small quantities and fluorine concentrations.

In the following examples, where the percentages are to be understood on a weight basis, and which illustrate the invention without limiting it, the plasticizing efficiency of the present polyfluorinated surfactants has been evaluated according to the Abrams cone test (also known by the name of the "slump-test").

This test, which allows the plasticity of a mortar or of a concrete to be assessed, consists in filling therewith a frustoconically shaped mould (height: 150 mm, upper diameter: 50 mm, lower diameter: 100 mm) and in measuring the shortening of the cone ("slump"), that is, the difference between the initial height (150 mm) and that of the cone after demoulding.

The tensile-flexural and compressive mechanical strength-characteristics have been determined according to the NF standard P 15-451 on test specimens obtained with the aid of a mould with three compartments 4×4×16 cm in size (NF standard P 15-413). The mould, filled with mortar or concrete is placed on a vibrating table (12,000 Hz) for 70 seconds. Then, the test specimens are kept for 16 and half hours in an enclosure with a water-saturated atmosphere at 50°±1° C.

This invention will now be described by way of experimentation. The experiments are not considered to limit the invention. They are illustrative only. They are not exclusive.

EXAMPLE 1 (control)

225 g of water and then 450 g of cement (class 55R) are introduced into a standardized plug mill (NF P 15-411). After 30 second's slow milling (61±5 rev/min), 1350 g of sand of constant particle size distribution (0 to 2 mm; NF standard P 15-403) are added. After another minute of slow milling, the speed is changed to 123±10 rev/min and this rapid milling is continued for 4 minutes.

When subjected to the plasticity and mechanical strength tests, the control mortar obtained in this manner gives the following results:
cone slump: 20 mm.
tensile-flexural strength: 5.23 megapascals.
compressive strength: 24.7 megapascals.

EXAMPLE 2

The procedure is as in Example 1, but with a reduction of 7% in water, that is, using only 209.25 g of water, to which a random cotelomer of acrylamide and 2-(perfluorohexyl)ethyl acrylate with carbon tetrachloride is added.

The results obtained are as follows
cotelomer 1.5 g, 1.7 g.
cone slump 25 mm, 27 mm.
tensile-flexural strength 5.56 MPa, 5.49 MPa.
compressive strength 30 MPa, 28.9 MPa.

The additive used in this example was prepared by redox-catalysed cotelomerization of 0.98 mole of acrylamide and 0.02 mole of acrylate $C_6F_{13}C_2H_4OCOCH\text{=}CH_2$ with 0.01 mole of $CCl_4$. The catalyst system is a mixture of ferric trichloride (0.008 mole) and benzoin (0.008 mole). The reactants are dissolved in 100 ml of acetonitrile and the reaction mixture is heated under reflux for 20 hours. The cotelomer precipitates. It is then filtered off, washed with ethyl ether and dried. The cotelomer thus obtained contains 1.37% of fluorine.

EXAMPLE 3

Example 2 is repeated, but the random cotelomer is replaced with one of the following products:

(A) Random copolymer obtained by radical copolymerization at 80° C. of acrylamide (0.55 mole) and 2-(perfluorohexyl)-ethyl acrylate (0.145 mole) in 560 ml of acetonitrile in the presence of 0.01 mole of azobisisobutyronitrile. Fluorine content: 20%.

(B) Telomer containing 2.68% of fluorine, whose preparation from acrylamide and 2-(perfluorohexyl)ethyl trichloroacetate is described in Example 13 of European Pat. No. 188,952.

(C) Telomer containing 11.84% of fluorine, whose preparation from acrylamide and 2-(perfluorohexyl)ethyl 2,4,4,4-tetrachlorobutyrate is described in Example 11 of European Pat. No. 188,952.

(D) Telomer containing 7.3% of fluorine, obtained by radical telomerization of 2-(perfluorohexyl)ethanethiol $C_6F_{13}C_2H_4SH$ with acrylamide (European Pat. No. 19,584).

(E) Telomer containing 1.65% of fluorine, whose preparation from acrylamide and 2-(perfluorohexyl)ethyl iodide $C_6F_{13}C_2H_4I$ is described in Example 11 of European Pat. No. 189,698.

(F) 2-(Perfluorohexyl)ethanesulphonic acid.

(G) N-[2-(Perfluorooctyl)ethyl] pyridinium p-toluenesulphonate.

(H) 3-(Perfluorooctyl)propanoic acid.

The following Table (I) shows, for each product the quantity used and the results obtained:

TABLE I

| Fluoro additive | Quantity added (in mg) | Cone slump (in mm) | Strengths (in MPa) Tensile flexural | Compressive |
|---|---|---|---|---|
| A | 92.5 | 28 | 5.65 | 27.5 |
| B | 400 | 25 | 5.7 | 30.5 |
| C | 78 | 26 | 6.17 | 30.6 |
| D | 32.9 | 28 | 5.62 | 27 |
| E | 54 | 25 | 6.35 | 31.5 |
| F | 180 | 23 | — | — |
| G | 1200 | 25 | — | — |
| H | 600 | 28 | — | — |

EXAMPLE 4

By following the procedure of Example 1 with 450 g of cement, 614 g of standardized sand (0 to 2 mm) and 735 g of pea gravel with a particle size distribution of 4 to 8 mm, a "control" concrete is prepared using 225 g of water and an "additive-containing" concrete using 209.25 g of water to which 1.5 g of the random cotelomer of Example 2 is added.

The plasticity and mechanical strength tests give the following results:

|  | Control concrete | Additive-containing concrete |
|---|---|---|
| Slump | 111 mm | 108 mm |
| Tensile-flexural strength | 4.59 MPa | 5.11 MPa |
| Compressive strength | 25 MPa | 29.5 MPa |

EXAMPLE 5

Example 4 is repeated, but the standardized sand is replaced with the same quantity of industrial sand (particle size distribution: 0 to 4 mm) and the random cotelomer with 54 mg of the telomer E defined in Example 3.

The following results are obtained:

|  | Control concrete | Additive-containing concrete |
|---|---|---|
| Slump | 94 mm | 92 mm |
| Tensile-flexural strength | 4.84 MPa | 5.64 MPa |
| Compressive strength | 31.4 MPa | 36.4 MPa |

EXAMPLE 6

By following the procedure of Example 1 with 450 g of cement, 784 g of industrial sand (0–4 mm) and 941 g of pea gravel (4–8 mm), a control concrete is prepared with 225 g of water and an additive-containing concrete using 209.25 g of water to which there is added 110 mg of a telomer containing 0.5% of fluorine, obtained by radical telomerization of 2-(perfluorohexyl)ethanethiol with acrylamide (European Pat. No. 19,584).

The following results are obtained:

|  | Control concrete | Additive-containing concrete |
|---|---|---|
| Slump | 47 mm | 46 mm |
| Tensile-flexural strength | 4.61 MPa | 5.1 MPa |
| Compressive strength | 26.1 MPa | 31.3 MPa |

EXAMPLE 7

Mortars which are reduced in weight are prepared in the same plug mill as in Example 1 and with the ingredients mentioned in Table II below, by proceding as follows:

The fluoro additive is introduced into water and then the cement and the sand are added over one minute while milling at a speed of 61±5 rev/min. Mixing is then continued for 4 minutes at a speed of 123±10 rev/min. Then, the product is cast into the three compartments of a mould and set at ambient temperature for 7 days, before demoulding.

The test specimens obtained are all homogeneous and show no shrinkage. Their weight and relative density are shown in the last two lines of Table II.

The fluoro additive (J) is the telomer containing 4.19% of fluorine, whose preparation from acrylamide and 2-(perfluorohexyl)ethyl iodide is described in Example 14 of European Pat. No. 189,698.

The fluoro additives (K1) and (K2) are telomers containing 12 and 8% of fluorine respectively, obtained by radical telomerization of acrylamide with 2-(perfluorohexyl)ethanethiol (European Pat. No. 19,584).

TABLE II

| Ingredients | | | | | | | |
|---|---|---|---|---|---|---|---|
| Fluoroadditive | None | J | J | J | J | K1 | K2 |
| and quantity (mg) | (control) | 390 | 200 | 200 | 900 | 450 | 580 |
| Water (g) | 225 | 209.3 | 200 | 210 | 300 | 210 | 216 |
| Cement (g) | 450 | 450 | 450 | 350 | 600 | 450 | 450 |
| Standarized sand (g) | 1350 | 1350 | 1350 | 1350 | 1350 | 1350 | 1350 |

TABLE II-continued

| Characteristics of The Test Specimens | | | | | | | |
|---|---|---|---|---|---|---|---|
| weight (g) | 520 | 320 | 431 | 387 | 245 | 272 | 247 |
| relative density | 2.24 | 1.26 | 1.68 | 1.51 | 0.95 | 1.1 | 0.97 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A method for preparing mortar or concrete, comprising the use, as a water-reducing plasticizer, of a polyfluorinated acrylamide-based surface-active compound selected from the group consisting of:
   (a) the random copolymers obtained by radical polymerization of acrylamide with a polyfluorinated acrylate of formula:

$$R_F(CH_2)_n-OCOC(R_7)=CH_2 \quad (VIII)$$

where $R_F$ is a linear or branched perfluoroalkyl radical containing from 4 to 14 carbon atoms, n is an integer ranging from 1 to 12, and $R_7$ is hydrogen or methyl, the molar ratio acrylamide/acrylate being between 10 and 200;
   (b) the random cotelomers resulting from the redox telomerization of acrylamide and of a polyfluorinated acrylate of formula (VIII) with carbon tetrachloride, the molar ratio acrylamide/acrylate being between 10 and 500; and
   (c) the block telomers of the formula:

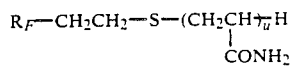

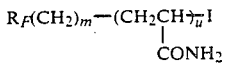

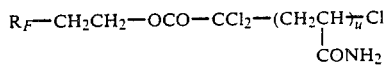

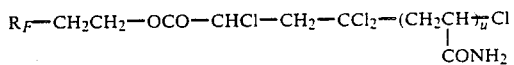

where $R_F$ is as defined above, m is an integer ranging from 0 to 12, and u is an integer ranging from 5 to 1000.

2. The method of claim 1, wherein the polyfluorinated surface-active compound is used in a quantity between 0.005 and 2% relative to the weight of water.

3. The method of claim 2, wherein the quantity of surface-active compound is between 0.01 and 0.5%.

4. The method of claim 1, wherein use is made of a block telomer (c) where u is an integer between 10 and 700.

5. The method according to claim 4, wherein the polyfluorinated surface-active compound is used in a quantity of between 0.005 and 2% relative to the weight of water.

6. The method according to claim 5, wherein the quantity of surface-active compound is between 0.01 and 0.5%.

* * * * *